IMPEDANCE COMPENSATOR

Filed April 8, 1948

WITNESSES:

E. A. McCloskey

Arthur S. Stewart

INVENTOR

Rathbun B. Squires.

BY C. L. Freedman

ATTORNEY

Patented Aug. 10, 1954

2,686,289

UNITED STATES PATENT OFFICE 2,686,289

IMPEDANCE COMPENSATOR

Rathbun B. Squires, Pittsburgh, Pa., assignor to Westinghouse Electric Corporation, East Pittsburgh, Pa., a corporation of Pennsylvania Application April 8, 1948, Serial No. 19,809

4 Claims. (Cl. 323—45)

This invention relates to negative impedances and to impedance devices, and relates particularly to impedance circuits adapted for use in alternating-current network analyzer or calculator circuits.

Network analyzers and calculators comprise a power source and various electrical impedances which are connected to form a miniature network similar to, and having electrical characteristics of, an actual or proposed full-size electrical distribution system. In the miniature network, impedances are electrically connected with the various units thereof having electrical characteristics proportional to those of the generating equipment, lines, transformers and various loads in the system being represented.

In the measuring circuits of such analyzers and calculators, it is very important to have correct impedances. Inductive impedances employed in miniature networks frequently are not representative of the desired inductive impedance because of an excessive or undesirable resistance component present in the inductive impedance.

The actual impedance to be represented may have a high inductance component and a low resistance component. A miniature impedance to represent an actual impedance would have the same ratio of inductive and resistance components but the components would be of smaller magnitude. If the impedance is substantially pure inductance and the miniature impedance has a resistance component of a magnitude which is out of proportion to the magnitude of the inductive component, the magnitude of the resistance component over and above that necessary to maintain the proper ratio or proportion, is herein frequently referred to as an excessive resistance component. If a pure inductive impedance is desired, any resistance component present therein, would be undesirable and therefore excessive.

Special inductive impedances are obtainable which do not have a proportionally high resistance component, but such inductive impedances are comparatively expensive because a special magnetic core is employed, or because a larger reactor is employed than would be normally required. Even a special inductance of a size used in miniature replica networks cannot be obtained which will have a low loss or low resistance component to accurately represent, in all cases, the respective impedances of power transformers, line reactances and other loads.

For example, it is very difficult, if not impossible, to design a miniature inductance to represent the internal impedance of a generator because the required ratio of the inductive component to the resistance component is very high. In addition, the ratio must be high for small values of inductance. The lead resistances and contact resistances in the circuits in this case become appreciable in comparison to the reactor impedance. If the lead and contact resistances are appreciable in comparison to the inductive component, there will be excessive resistance in the circuit as a whole, even if the miniature inductance is perfect and has zero resistance. In some instances, it is necessary to have the current lag the voltage by substantially 90° in an impedance circuit to properly represent the desired impedance.

One method of simulating an impedance is to employ a negative impedance along with an inductance of the commercial type having both a desired inductive component and, in addition, an excessive resistance component.

A "negative impedance" is considered in the art, as the opposite of a positive impedance. For example, a resistance in the circuit dissipates electrical energy while a negative resistance supplies electrical energy to a circuit equivalent to the energy that would be dissipated by a positive resistance therein.

Auxiliary circuits employing vacuum or electronic tubes, have been employed as a negative impedance for supplying electrical energy to an impedance circuit. Such tubes, however, require auxiliary circuits and devices, and periodically become defective, thereby adding to the complexity and to the installation and maintenance cost of the apparatus. In addition, such tubes frequently require a separate source of electrical energy, such as a direct-current supply, for proper operation.

As one means of supplying a negative impedance between a pair of terminals having an impedance connected therebetween, an auxiliary electronic circuit for supplying an auxiliary voltage, is connected between the terminals in shunt with the impedance. Since the losses supplied by the auxiliary arrangement between the terminals are proportional to the square of the voltage applied to the terminals, the inductance, if sectionalized or adjustable must frequently be provided with a conductor which is tapered in size to give proper conductor resistance to permit adjusting the magnitude of the inductance without affecting the power factor.

In accordance with this invention, a transformer is employed to insert a negative impedance in an impedance circuit which reflects a corresponding positive impedance in an associated circuit in series therewith. An auxiliary voltage is inserted in an impedance circuit between a pair of terminals which is proportional to the current flowing between the terminals.

It is, accordingly, an object of the present invention to produce an improved and greatly simplified impedance circuit.

It is another object of the invention to insert a negative impedance in one portion of a series circuit which is derived from a positive impedance in another portion of the circuit.

It is a further object of the invention to provide an improved auxiliary arrangement for neutralizing the effect of the losses in an impedance circuit.

It is a further object of the invention to provide an improved variable impedance circuit adapted to counteract automatically the losses or excessive impedance component in a variable impedance device therein, as the magnitude of the impedance in the circuit is varied.

It is a further object of the invention to provide an improved auxiliary circuit for supplying to an impedance circuit an auxiliary voltage substantially 180° out of phase with, and proportional to, the current therethrough, to neutralize the voltage drop in the impedance circuit caused by an excessive resistance component therein.

It is still a further object of the invention to provide an improved impedance device in which one or more negative impedance components may be supplied to an impedance circuit thereof.

Other objects of the invention will be apparent from the following description, taken in conjunction with the accompanying drawing, in which.

Figures 1, 2:
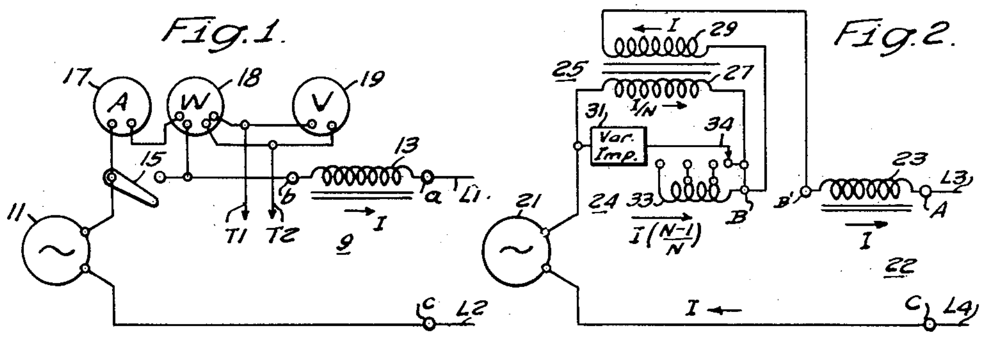
Fig. 1. Fig. 2. PRIOR ART
Figure 1 is a schematic representation of an impedance circuit of the prior art.
Fig. 2 is a schematic view of an impedance circuit employing a novel impedance compensator embodying the invention.

Referring to the drawing, Figure 1 shows a circuit of the prior art having an impedance circuit 9 connected between terminals $a$ and $b$, energized by an alternating-current generator or voltage supply 11. The lines L1 and L2 which are energized by the voltage supply 11 are connected to a network system. An impedance in the form of an inductance 13 is connected in the impedance circuit 9 between the terminals $a$ and $b$. The current flowing through the impedance circuit 9 and the inductance 13 therein, and the voltage and power supplied to the lines L1 and L2, may be measured by the conventional ammeter-voltmeter-wattmeter method illustrated.

To obtain ammeter and wattmeter readings, a knife switch 15 connected between the terminal $b$ and the voltage supply 11, is opened to cause the current supplied to the lines L1 and L2 to flow through the ammeter 17 and the current coils of the wattmeter 18. To impress a voltage upon a voltmeter 19 and the potential coil of the wattmeter 18, a pair of leads T1 and T2 are provided to permit measuring potential differences between various points or terminals.

For example, if the free ends of the test leads T1 and T2 are connected to a terminal $a$ in line L1 and a terminal $c$ in line L2, respectively, the wattmeter 18 when switch 15 is open will read the power output to the network system, the ammeter 17 will read the current flowing through the network system, and the voltmeter 19 will read the voltage between terminals $a$ and $c$. The wattmeter reading may be expressed mathematically as $IEac$ cosine $\theta_1$, where I is the ammeter reading Eac the voltmeter reading and $\theta_1$ is the phase angle between I and $Eac$. Similarly, when the test leads T1 and T2 are connected to a terminal $b$ and terminal $c$, respectively, the wattmeter will read the total of the power to the network system plus the power loss in the inductance 13. The wattmeter reading may be expressed mathematically as $IEbc$ cosine $\theta_2$. In this case, $\theta_2$ is the angle between Ebc, the reading of the voltmeter 19, and I the reading of the ammeter 17. Furthermore, when the test leads T1 and T2 are connected to terminals $b$ and $a$, respectively, the wattmeter 18 will read the power loss of the inductance 13, the later reading being expressed $IEBa$ cosine $\theta_3$. In this latter case, $\theta_3$ is the angle between Eba, the reading of the voltmeter 19, and I, the reading of the ammeter 17.

Although special and complicated metering circuits are frequently employed in network analyzers and calculators to facilitate making various electrical measurements, the aforementioned readings obtainable by employing the simple instrument circuit illustrated in Fig. 1 indicates that the component of the voltage between terminals $b$ and $a$ in phase with the current I, must be very small to represent an impedance which is nearly pure inductance. The impedance circuit shown in Fig. 1 is in accordance with the teachings of the prior art.

Fig. 2 shows an impedance circuit employing the invention, having an alternating-current generator or voltage supply 21 connected between lines L3 and L4 which may be connected to any suitable replica of a network system. In line L3, an impedance circuit 22 is connected between terminals A and B. An impedance, such as an inductance or reactor 23 of the commercial type having an excessive resistance component, is connected in the impedance circuit 22 between the terminal A and a terminal B'. An auxiliary circuit 24 containing a variable impedance 31 is connected between the voltage supply 21 and the terminal B. Although the variable impedance 31 may be resistance inductance, capacitance or a combination thereof, it will be assumed herein that the variable impedance 31 is pure resistance.

A small reactor 33 of the variable or sectionalized type may be serially connected in the auxiliary impedance circuit 24 by adjusting a contact arm 34. By moving the contact arm 34, all or a portion of the reactor 33 may be inserted in the auxiliary circuit 24. To simplify the following discussion, it will be assumed that the contact arm 34 is in the position shown so no current flows through the reactor 33.

A transformer 25 having a primary winding 27 and a secondary winding 29, has the primary winding 27 connected in shunt with the auxiliary circuit 24. The secondary winding 29 is connected in the impedance circuit 22 between terminals B and B′ in series with the reactor 23.

By employing the auxiliary circuit 24 and the transformer 25 in the manner just described, an auxiliary voltage may be introduced in the impedance circuit 22 between terminals B and B′ in series with the reactor 23, said auxiliary voltage, when the variable impedance 31 is pure resistance, being substantially 180° out of phase with the current flowing in the impedance circuit 22. Electrical measurements may be taken between terminal B and terminal A in line L3, and a terminal C in line L4. The electrical measurements may be taken by a suitable metering system such, for example, as the system described with reference to Fig. 1.

By selecting the proper resistance in the auxiliary circuit 24 by adjusting the variable impedance 31, an auxiliary voltage is introduced in the impedance circuit 22 in Fig. 2, which equals the voltage drop due to the excessive resistance component in the reactor 23. Because the impedance simulated between terminals B and A has little or no apparent resistance component, due to the auxiliary voltage introduced between the terminals B and B′, the component of the measured voltage drop, which is in phase with the current, as measured between terminals A and B, is therefore either reduced or practically zero, as desired.

The operation of the circuit of Fig. 2 may better be understood by considering the equations involved:

Let $N$=turn ratio of transformer 25, i. e., the ratio of the number of turns of the primary winding 27 to the number of turns of the secondary winding 29.

$I$=the current supplied to network system flowing through impedance circuit 22.

$R$=resistance of variable impedance 31.

$Ep$=primary voltage applied to primary winding 27.

$Es$=secondary or auxiliary voltage supplied to impedance circuit 22.

$Rx$=excessive resistance component of reactor 23.

Before developing the equations, it is to be observed that the secondary winding 29 is so connected with respect to polarities that the secondary voltage Es is 180° out of phase with the current I. This secondary or auxiliary voltage Es has such a relation to the current flowing in the impedance circuit 22 that a negative resistance is effectively inserted in the circuit.

Since the secondary winding 29 is connected serially in the impedance circuit 22, a current I flows therethrough. The instantaneous current induced in the opposite direction in the primary winding 27 as a result of the current flowing in the secondary winding 29 is I/N, as indicated on the drawing. The secondary current is, of course, I/N only if the exciting current of the transformer 25 is negligible compared to I/N. As is well understood in the art, this condition can easily be achieved by employing an appropriately designed transformer. It is to be observed that the primary winding 27 is in parallel with the auxiliary circuit 24, and the current I is divided, so that the current I/N flows in the secondary winding 29 and a current $(I-I/N)$ or $$I\left(\frac{N-1}{N}\right)$$

flows through the auxiliary impedance circuit 24.

By employing Ohms' law, it follows that $$\text{(A)} \qquad Ep=IR\left(\frac{N-1}{N}\right)$$

and $$\text{(B)} \qquad Es=(I/N)R\left(\frac{N-1}{N}\right) \text{ or } IR\left(\frac{N-1}{N^2}\right)$$

By solving Equation B or R, $$\text{(C)} \qquad R=\left(\frac{Es}{I}\right)\frac{N^2}{N-1}$$

The variable impedance 31, which in this case is a variable resistor, is adjusted so that Es equals IRx. Therefore, it follows that $$\text{(D)} \qquad Rx=\frac{Es}{I}$$

Therefore, in order to introduce a negative resistance or an auxiliary voltage Es 180° out of phase with the current I in the impedance circuit 22, which will equal the voltage drop due to Rx, Rx from Equation D may be substituted for $$\left(\frac{Es}{I}\right)$$

in Equation C and the resulting equation is:

$$\text{(E)} \qquad R=Rx\left(\frac{N^2}{N-1}\right)$$

When the relationship between R and Rx is that expressed in Equation E, the apparent or simulated impedance between terminals B and A will represent an impedance having no excessive resistance component Rx.

If the variable impedance 31 were a capacitor or a reactor, instead of a resistor, the phase angle of the secondary or auxiliary voltage Es would be changed or shifted with respect to the current I flowing in the impedance circuit 22 and a negative capacitance or a negative reactance, instead of a negative resistance, would be inserted in the impedance circuit 22.

Assuming that a pure inductance is desired in the impedance circuit 22, and proper relations between R and Rx are established in accordance with Equation E, the voltage between terminals B and A will not have a component in phase with the current I and the measured component of voltage drop in phase with the current will be zero. In other words, the total power read between terminals A and C will be the same as the total power read between terminals B and C. There will, of course, be losses between terminal B and the voltage supply 21, but since such losses are not measured, they are not significant.

It is desirable to keep the primary voltage Ep low because it tends to increase the regulation of the voltage source, and since the secondary voltage Es is fixed by the resistance of the reactor 23, N preferably should be close to unity. The lower limit for N is influenced by the fact that the current through the resistor 31 should preferably be large compared with the exciting current of the transformer, and, also compared with the current drawn by the voltage measuring circuit connected to B, even though this latter current may not, in most cases, be over two milliamperes. The closer N is to unity, the smaller the current through the variable impedance 31 will be.

The leakage reactance of the transformer 25 may slightly increase the inductance between the terminals B and A. By adding a suitable inductance by means of the variable reactor 33 in series with the variable impedance 31 in the auxiliary circuit 24, it is possible to adjust the contact arm 34 to compensate for the inductance introduced by the transformer 25 in the impedance circuit 22 between terminals B and A.

Figure 3:
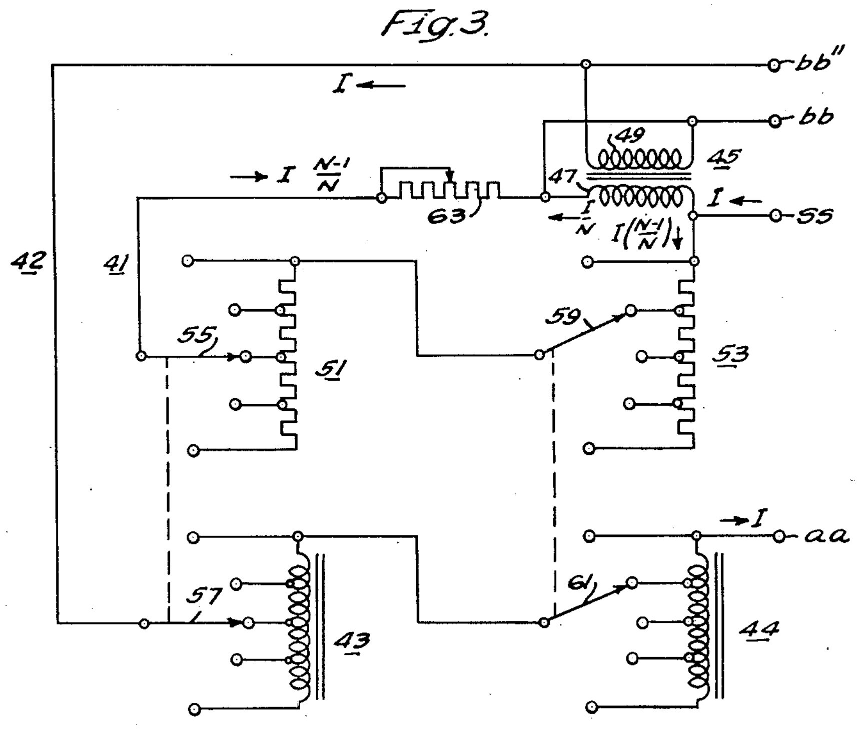
Fig. 3 is a schematic view of an impedance therein circuit having a variable impedance therein and automatic compensating means therefor.

In Fig. 3, an auxiliary circuit 41 and an impedance circuit 42 each contains one or more variable or sectionalized impedances. The auxiliary circuit 41 contains an auxiliary sectionalized or variable impedance or resistor 51 with suitable taps and a selector arm 55 associated therewith, and a secondary auxiliary sectionalized or variable impedance or resistor 53 with suitable taps and a selector arm 59 associated therewith. Similarly, the impedance circuit 42 contains a sectionalized or variable impedance such as a reactor 43 with suitable taps and a selector arm 57 associated therewith and a second sectionalized or variable impedance such as a reactor 44 with suitable taps and a selector arm 61 associated therewith. A transformer 45 having a primary winding 47 and a secondary winding 49, is connected so that the primary winding 47 is in shunt with the auxiliary circuit 41 and the secondary winding 49 is serially connected in the impedance circuit 42.

The auxiliary circuit 41 may be traced from a terminal *bb* through a compensating resistor 63, the selector arm 55, the auxiliary resistor 51, the selector arm 59, a second auxiliary resistor 53 to a terminal SS which is connected to a suitable voltage supply. The impedance circuit 42 may be traced from terminal *bb* through the secondary winding 49 of the transformer 45 and through the selector arm 57, the impedance or reactor 43, the selector arm 61, the second impedance or reactor 44 to a terminal *aa* which is connected to a representative network system in miniature.

As a switching means, each of the selector arms 55, 57, 59 and 61 is provided to contact the various taps or contacts on the resistance, inductance or impedance associated therewith. The selector arms 55 and 57 are so interconnected that the movement of the selector arm 57 to increase or decrease the inductance or impedance inserted in the impedance circuit 42 is accompanied by similar movement of the selector arm 55 to correspondingly increase or decrease the resistance inserted in the auxiliary circuit 41.

Similarly, the selector arms 59 and 61 are also interconnected so that a variation of the impedance in the impedance circuit 42 by the movement of the selector arm 61 is accompanied by a corresponding movement of the selector arm 59 and a variation of the resistance in the auxiliary circuit 41. By this arrangement and a suitable relationship between the impedance and resistance values, it is possible to vary the magnitude of the impedance or inductance in the impedance circuit 42 over a wide range of values and to automatically compensate for the excessive resistance component thereof for any value of inductance.

In order to compensate the impedance device so that an adjustment of the impedance in the impedance circuit 42 will be accompanied by a correct adjustment of the auxiliary circuit 41, an adjustable impedance, such as the small adjustable resistor 63, is connected in the auxiliary circuit 41 to compensate for excessive lead resistance and other fixed resistance which do not vary when the inductance in the circuit 42 is varied.

With an impedance device, as shown in Fig. 3, employed in a network calculator, numerous impedances may be simulated between terminals *bb* and *aa*. The impedance characteristics of the auxiliary circuit 41 are inserted in the impedance circuit 42 as a negative impedance. For example if the auxiliary circuit 41 contains resistance, a negative resistance is inserted in the impedance circuit 42, or if the auxiliary circuit 41 contains reactance or capacitance, a negative reactance or negative capacitance is inserted in the impedance circuit 42. To employ such impedance device in a network analyzer, terminal *aa* is connected to a representative network system in miniature and terminal *bb* is connected to a suitable instrument or metering circuit. However, if no impedance compensation is desired, terminal *bb''* may be connected to the instrument or metering circuit, instead of *bb*.

The invention has been described with reference to employing an impedance compensator in connection with a network calculator, but the invention is not necessarily limited to such application, and is capable of use in any application where it is desirable to insert a negative impedance between a pair of terminals in an alternating-current system. Although the invention has been described with reference to certain specific embodiments thereof, numerous other modifications are also possible. Therefore, the appended claims have been drafted to cover not only the specific embodiments herein disclosed, but also all other embodiments falling within the spirit and scope of the invention.

I claim as my invention:

1. An impedance unit comprising a pair of line terminals for connection to a source of voltage and an external circuit, a transformer having a first winding and a second winding, an impedance element having a substantially desired impedance and an undesired impedance component, an impedance circuit comprising said second winding and said impedance element connected in series between a pair of impedance terminals, said impedance circuit and said first winding being connected in series between said pair of line terminals, and an auxiliary impedance circuit connected in parallel with said first winding, the magnitude of said auxiliary impedance circuit and the polarity and ratio of said windings being selected to compensate for said undesired impedance component and to effect a predetermined impedance of appreciable magnitude between said impedance terminals.

2. An impedance unit as claimed in claim 1, wherein said impedance circuit comprises a variable impedance.

3. An impedance unit comprising a pair of line terminals for connection to a source of voltage and an external circuit, a transformer having primary and secondary windings with turn ratios of N to one, respectively, an impedance element having a desired inductive impedance and an excessive resistance component of X ohms, an impedance circuit comprising the secondary winding and said impedance element connected in series between a pair of impedance terminals, said impedance circuit and the primary winding being connected in series between said pair of line terminals, and an auxiliary impedance circuit of substantially $$X\frac{N^2}{N-1}$$

ohms connected in parallel with the primary winding to introduce an auxiliary voltage between the impedance terminals to compensate for the excessive resistance component.

4. In a system for providing a desired impedance between a pair of terminals, an impedance element having desired and undesired impedance components, a source of alternating current, a transformer having first and second mutually-coupled windings, said impedance element and said second winding being connected in series between said terminals and being connected in series with said source and said first winding, and a compensating circuit connected across said first winding for neutralizing the impedance of said undesired impedance component, said transformer windings being poled to provide across said terminals substantially said desired impedance of predetermined and appreciable magnitude.

References Cited in the file of this patent

UNITED STATES PATENTS

| Number | Name | Date |
|---|---|---|
| 1,399,968 | Knopp | Dec. 13, 1921 |
| 1,743,752 | Boyajian | Jan. 14, 1930 |
| 1,756,816 | Dolmage | Apr. 29, 1930 |
| 1,953,773 | Richart | Apr. 3, 1934 |
| 1,994,279 | Higgins | Mar. 12, 1935 |
| 2,276,032 | Gibbs | Mar. 10, 1942 |
| 2,487,942 | Phillips | Nov. 15, 1949 |